(No Model.)
L. E. THOMAS.
CLOTHES LINE REEL.
No. 421,452. Patented Feb. 18, 1890.
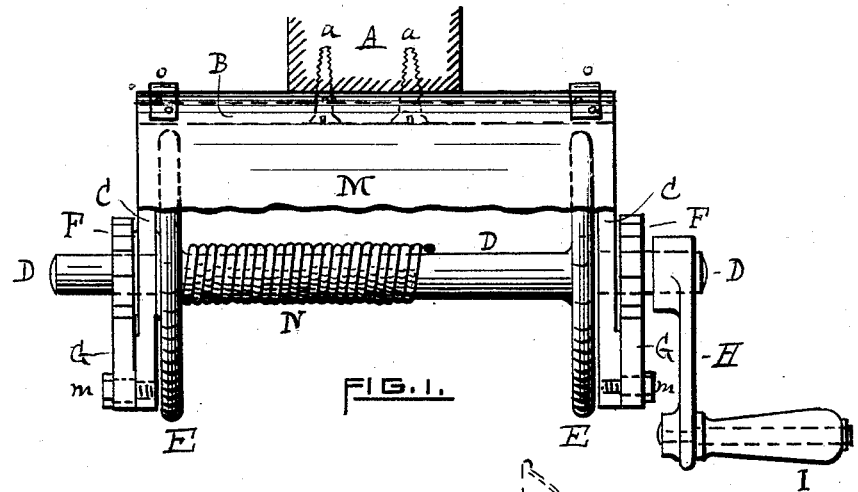
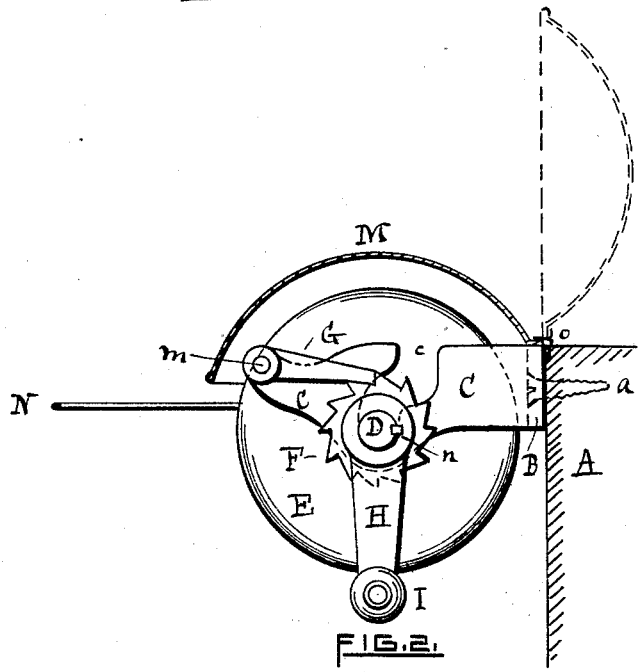
WITNESSES
INVENTOR.
Lewis E. Thomas

UNITED STATES PATENT OFFICE.

LEWIS E. THOMAS, OF NANTUCKET, MASSACHUSETTS, ASSIGNOR OF ONE-HALF TO GEORGE H. HALL, OF NORTH KINGSTON, RHODE ISLAND.

CLOTHES-LINE REEL.

SPECIFICATION forming part of Letters Patent No. 421,452, dated February 18, 1890.

Application filed October 26, 1889. Serial No. 328,286. (No model.)

*To all whom it may concern:*

Be it known that I, LEWIS E. THOMAS, of the town of Nantucket, in the county of Nantucket, in the State of Massachusetts, have invented a certain new and useful Improvement in Clothes-Line Reels; and I declare the following to be a specification thereof, reference being had to the accompanying drawings.

Like letters indicate like parts.

Figure 1 is a top plan of my invention. Fig. 2 is a side elevation of the same.

My invention is a reel for clothes-lines; and it consists of a reel mounted between brackets, with ratchet-wheels and a crank on the shaft, pawls to engage with said ratchets, and a folding cover, as hereinafter particularly described.

In the drawings, A represents a post or wall, to which my improved reel is fastened by screws *a*.

B is the base-plate, having on each side a bracket C, slotted at *c*, as shown in solid and dotted lines.

D is a shaft or spindle having two circular disks E permanently attached thereto. The shaft D projects on each side beyond the brackets C. Ratchet-wheels F are fastened to the shafts D—one on each side—and pawls G, pivoted at *m* to the outer extremity of the brackets C, respectively, engage by gravitation with said ratchet-wheels. A crank H is attached to the end of the shaft D and is secured in position by the key *n*. The crank has the usual handle I. Each end of the shaft D is grooved so that the crank can be applied to either end and be there keyed in position, as shown. A cover or hood M is hinged at *o* to the base-plate B and covers the reel, as seen in Fig. 2. It can be raised to the position indicated by dotted lines in said figure. In Fig. 1 the hood is shown broken away along the front to expose the reel in top plan. The clothes-line N is fastened to the shaft D and is reeled, as seen in Fig. 1, by turning the crank. When the line N has been unreeled and its end has been attached to a hook or staple, it can be drawn taut by means of the crank and is held strained by the pawls G engaging with the ratchet-wheels F. When the line is not in use, it can be completely reeled up by winding it in, and the cover M, being then in the position shown in Fig. 2 in solid lines, protects it from exposure to the weather. By means of this device the clothes-line is always ready for immediate use, and instead of being wound on a common reel and carried away until it is to be used again, is always in place, protected when not stretched in use, and more easily manipulated, drawn, stretched, and wound than by the device heretofore commonly used. By slotting the brackets C, as shown at *c*, I am able to entirely disengage the reel for its removal or for the attachment of the line to it.

I claim as a novel and useful invention, and desire to secure by Letters Patent—

The improved clothes-line reel herein described, consisting of a base-plate having slotted brackets, a shaft mounted and rotatable in said brackets, two disks and ratchet-wheels permanently attached to said shaft, a crank adapted to be used at either end of said shaft, pawls mounted on said brackets and engageable with said ratchet-wheels, and a cover hinged to the top edge of said base-plate, substantially as shown, and for the purpose specified.

LEWIS E. THOMAS.

Witnesses:
WARREN R. PERCE,
ALBERT D. BEAN.